US012746180B2

(12) United States Patent
Bjoern-Henriksen

(10) Patent No.: US 12,746,180 B2
(45) Date of Patent: Sep. 29, 2026

(54) LONG FOLDABLE ICE BATH

(71) Applicant: Bjorn Capital Group LLC, Dover, DE (US)

(72) Inventor: Simon Bjoern-Henriksen, Dover, DE (US)

(73) Assignee: Bjorn Capital Group LLC, Dover, DE (US)

( * ) Notice: Subject to any disclaimer, the term of this patent is extended or adjusted under 35 U.S.C. 154(b) by 98 days.

(21) Appl. No.: 18/796,856

(22) Filed: Aug. 7, 2024

(65) Prior Publication Data

US 2025/0367072 A1 Dec. 4, 2025

Related U.S. Application Data

(63) Continuation-in-part of application No. 29/945,537, filed on Jun. 4, 2024, now Pat. No. Des. 1,107,931.

(51) Int. Cl.
*A61H 33/00* (2006.01)

(52) U.S. Cl.
CPC . *A61H 33/6005* (2013.01); *A61H 2201/0103* (2013.01); *A61H 2201/0161* (2013.01)

(58) Field of Classification Search
CPC .................................................. A61H 33/6005
See application file for complete search history.

(56) References Cited

U.S. PATENT DOCUMENTS

D32,713 S 5/1900 Bowman
D317,354 S 6/1991 Taylor
D319,492 S 8/1991 Taylor
5,085,212 A 2/1992 DeCosta
D353,891 S 12/1994 Wadsworth
D358,633 S 5/1995 McKeone
D377,518 S 1/1997 Bainey
D407,148 S 3/1999 Smith et al.
D451,986 S 12/2001 Marshall et al.
D453,839 S 2/2002 Rho
D470,579 S 2/2003 Foster
D480,817 S 10/2003 Carreau
D483,098 S 12/2003 Shimizu
D483,099 S 12/2003 Shimizu
D489,436 S 5/2004 Shimizu
D566,247 S 4/2008 Cunningham
D614,738 S 4/2010 Lebrun
D654,991 S 2/2012 Oliveira
D694,866 S 12/2013 Quigley
D711,517 S 8/2014 Newson
(Continued)

OTHER PUBLICATIONS

The Long Pod, podcompany.com, reviewed Jul. 31, 2024, retrieved Aug. 18, 2025, online, URL: https://podcompany.com/products/long-pod-ice-bath (Year: 2025).

*Primary Examiner* — Christine J Skubinna
(74) *Attorney, Agent, or Firm* — Banner & Witcoff, Ltd.

(57) ABSTRACT

Aspects described herein may relate to an ice bath that may include an elongated oval-shaped wall forming an opening a bottom attached to the wall, wherein the wall and the bottom form an ice bath configured to contain water, a plurality of vertical frame members, a plurality of horizontal frame members, a plurality of T-shaped connecting members configured to engage the plurality of vertical frame members and the plurality of horizontal frame members, wherein the frame members are configured to support the wall.

18 Claims, 14 Drawing Sheets

(56) References Cited

U.S. PATENT DOCUMENTS

| | | | |
|---|---|---|---|
| D714,427 S | 9/2014 | Oliveira | |
| D724,706 S | 3/2015 | Meneghello et al. | |
| D726,292 S | 4/2015 | Spangler | |
| D741,436 S | 10/2015 | Lin et al. | |
| D745,644 S | 12/2015 | Burke | |
| D745,645 S | 12/2015 | Burke | |
| D747,446 S | 1/2016 | Yoshioka | |
| D753,804 S | 4/2016 | Taingtae et al. | |
| D782,627 S | 3/2017 | Gomes de Oliveira | |
| D784,499 S | 4/2017 | Malinowska-Gebska et al. | |
| D794,168 S | 8/2017 | Starck et al. | |
| D826,384 S | 8/2018 | Bowen et al. | |
| D827,789 S | 9/2018 | Bowen et al. | |
| D827,790 S | 9/2018 | Bowen et al. | |
| D827,791 S | 9/2018 | Bowen et al. | |
| D837,958 S | 1/2019 | Bowen et al. | |
| D892,987 S | 8/2020 | Tonini et al. | |
| D895,079 S | 9/2020 | Moir et al. | |
| D895,080 S | 9/2020 | Moir | |
| D895,081 S | 9/2020 | Lee | |
| D904,580 S | 12/2020 | Moir et al. | |
| D904,581 S | 12/2020 | Lee | |
| D905,210 S | 12/2020 | Moir | |
| D913,456 S | 3/2021 | Manz | |
| D933,796 S | 10/2021 | Bowen et al. | |
| D943,068 S | 2/2022 | Kang et al. | |
| D948,002 S | 4/2022 | Bélanger | |
| D963,132 S | 9/2022 | Adams | |
| D963,815 S | 9/2022 | Stromborg | |
| D963,816 S | 9/2022 | Bowen et al. | |
| D965,752 S | 10/2022 | Lou | |
| D967,357 S | 10/2022 | Lejoly | |
| D967,358 S | 10/2022 | Starck | |
| D994,845 S | 8/2023 | Bowen et al. | |
| D1,001,982 S | 10/2023 | Adams | |
| D1,008,397 S | 12/2023 | Tai | |
| D1,008,428 S * | 12/2023 | Wu | D23/277 |
| D1,021,018 S | 4/2024 | Wu | |
| D1,024,290 S | 4/2024 | Zhou | |
| D1,025,313 S | 4/2024 | Li | |
| D1,028,182 S | 5/2024 | NegrãO Valente | |
| D1,040,305 S | 8/2024 | Meyers | |
| D1,041,626 S | 9/2024 | He | |
| D1,047,090 S | 10/2024 | Yuan | |
| D1,067,443 S | 3/2025 | Li | |
| D1,070,034 S * | 4/2025 | Zhou | D23/277 |
| D1,080,844 S | 6/2025 | Zhang | |
| D1,081,936 S | 7/2025 | Mao | |
| 2002/0042949 A1 * | 4/2002 | Lee | E04H 4/0056<br>4/506 |
| 2016/0215513 A1 * | 7/2016 | Liu | E04H 4/1272 |
| 2018/0255978 A1 | 9/2018 | Ploski | |
| 2023/0320930 A1 | 10/2023 | Hearn et al. | |
| 2024/0382377 A1 * | 11/2024 | Ponton | A61H 33/0095 |

* cited by examiner

LONG FOLDABLE ICE BATH

CROSS REFERENCE TO RELATED APPLICATION

This is a continuation-in-part application claiming priority to U.S. Design patent application Ser. No. 29/945,537 filed Jun. 4, 2024, which is incorporated by reference in its entirety.

TECHNICAL FIELD

The present disclosure generally relates to ice bath and ice bath cooling systems. In particular, elongated oval-shaped ice bath systems and methods of making that may include collapsible and modular components.

BACKGROUND

By way of introduction, aspects discussed herein may relate to a collapsible and transportable ice bath system and methods of making such systems. Research has indicated that cold therapy provides many physical benefits as well as mental and chemical benefits. For example, athletes and sports medicine has utilized cold water therapy for years, to help the active recovery of muscles. However, such prior art systems are large, require a large footprint, and are typically extremely expensive.

Accordingly, the systems described herein may address one or more problems of improving and adapting ice bath systems for everyday use in confined or limited space. In particular, the systems described herein are modular and collapsible to facilitate ease of transport and minimal required footprint.

SUMMARY

The following presents a simplified summary of various aspects described herein. This summary is not an extensive overview and is not intended to identify key or critical elements or to delineate the scope of any claim. The following summary merely presents some concepts in a simplified form as an introductory prelude to the more detailed description provided below.

Aspects disclosed herein relate to ice bath that may include an elongated oval-shaped wall forming an opening and comprising a water inlet valve, a water exit valve, and an inflatable upper lip positioned on a top portion of the wall, and wherein the inflatable upper lip is rotatable from a lower stowed position to an upper deployed position after inflated with air, a bottom attached to the wall, wherein the wall and the bottom form an ice bath configured to contain water, a plurality of vertical frame members, a plurality of horizontal frame members, a plurality of T-shaped connecting members configured to engage the plurality of vertical frame members and the plurality of horizontal frame members, wherein the frame members are configured to support the wall.

In some examples, the ice bath wall and/or bottom may include a drain. In other examples, the plurality of T-shaped connecting members may be hollow. In yet other examples, the wall may include a first side, a second side, a first end, and a second end, and the first side and the second side may each comprise an integrated U-shaped frame member forming a lower horizontal frame member and three vertical arms, and the three vertical arms may engage an upper horizontal frame member. In one example, the plurality of vertical frame members and the plurality of horizontal frame members may support the first end and the second end. In other examples, the ice bath may also include at least two straps or support bands configured to support the bottom. In some examples, the at least two straps or support bands may be affixed to the lower horizontal frame member of the first side and the lower horizontal member of the second side. In other examples, the water inlet valve and the water exit valve may be configured to engage an external water cooling and circulation system. In still other examples, the ice bath may include a lid. In still another example, the lid may include an inflatable perimeter, and the inflatable perimeter may be configured to fit an interior perimeter of the opening, and the lid may be secured to the opening via friction fit.

Some aspects described herein may include a method of forming an ice bath comprising the steps of forming an elongated oval-shaped wall having an opening, a first side, a second side, a first end, a second end in which the elongated oval-shaped wall may further include a water inlet valve, a water exit valve, and an inflatable upper lip positioned on a top portion of the wall, and the inflatable upper lip may be rotatable from a lower stowed position to an upper deployed position after inflated with air, forming a bottom and affixing the bottom to the wall in which the wall and the bottom form an ice bath configured to contain water, forming a plurality of vertical frame members, forming a plurality of horizontal frame members, and forming a plurality of T-shaped connecting members configured to engage the plurality of vertical frame members and the plurality of horizontal frame members in which the frame members are configured to support the wall and the bottom.

In some examples, the method may further include the steps of forming an integrated U-shaped frame member integrated with the first side and the second side, and the integrated U-shaped frame member may include a lower horizontal frame member and three vertical arms, and the three vertical arms may engage an upper horizontal frame member. In yet another example, the plurality of vertical frame members and the plurality of horizontal frame members may support the first end and the second end. In other examples, the method may further include the step of forming at least two straps or support bands that may be configured to support the bottom, and the at least two straps or support bands may be affixed to the lower horizontal frame member of the first side and the lower horizontal member of the second side. In some examples, the U-shaped frame member may be formed of a metal, alloy, polymer, composite, or combinations thereof. In other examples, the plurality of horizontal frame members may be formed of a metal, alloy, polymer, composite, or combinations thereof. In another example, the plurality of vertical frame members may be formed of a metal, alloy, polymer, composite, or combinations thereof. In some examples, the wall and the bottom may be formed of a canvas or other synthetic material. In one example, the method may further include the step of forming an ice bath lid to cover the opening of the ice bath.

Other aspects disclosed herein may relate to ice bath systems that may include a wall having a water inlet valve, a water exit valve, and an inflatable upper lip positioned on a top portion of the wall in which the inflatable upper lip may be rotatable from a lower stowed position to an upper deployed position after inflated with air, a bottom attached to the wall in which the wall and the bottom form an ice bath configured to contain water, a plurality of vertical frame members, a plurality of horizontal frame members, a plurality of T-shaped connecting members configured to engage the plurality of vertical frame members and the plurality of horizontal frame members, and the frame members may be configured to support the wall and the bottom, and a chilling system removably engaged to the water inlet valve and the water exit valve, and configured to circulate and cool water contained within the bath.

These features, along with many others, are discussed by way of example in greater detail below. Corresponding systems and methods are also within the scope of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
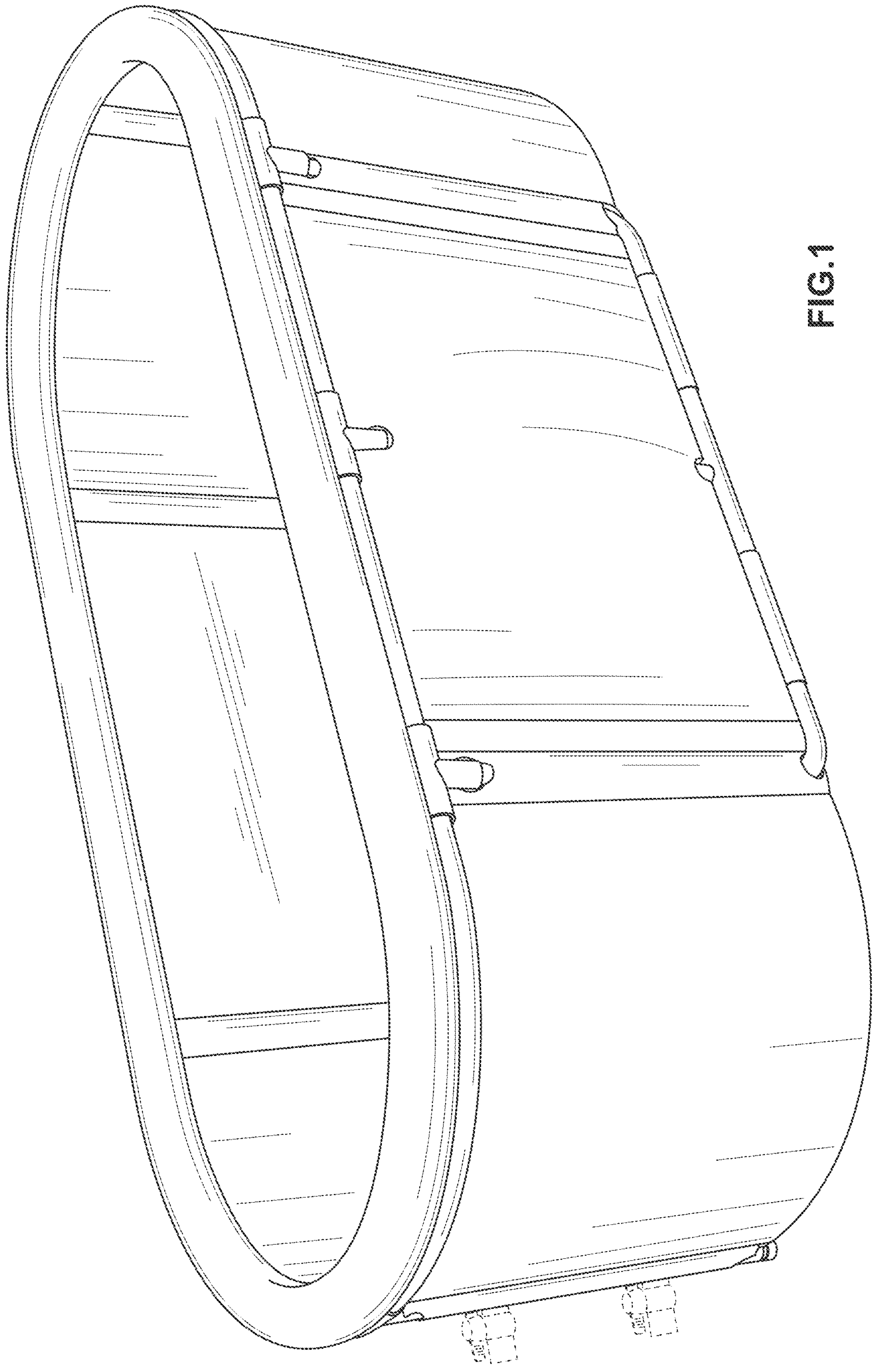
FIG. 1 is a perspective side view of the elongated ice bath including an inlet water valve and an outlet water valve according to one example as described herein.
Figure 2:
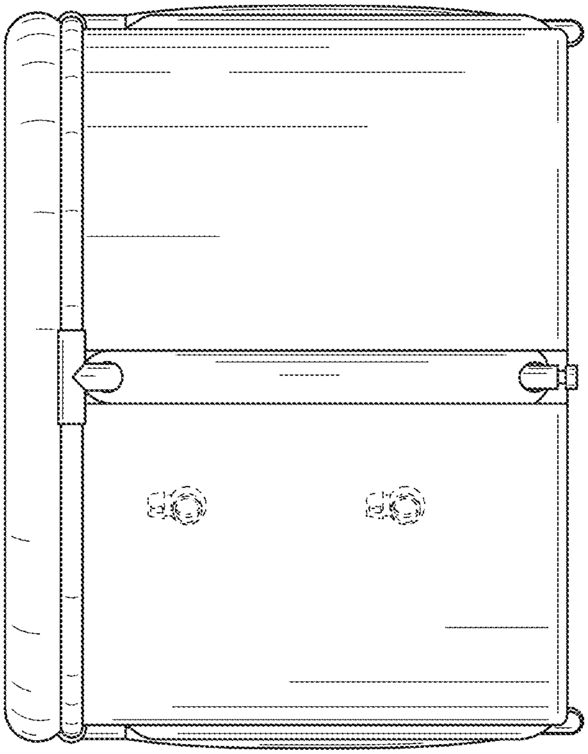
FIG. 2 is a first side view of the same showing a short side of the elongated ice bath as described herein.
Figure 3:
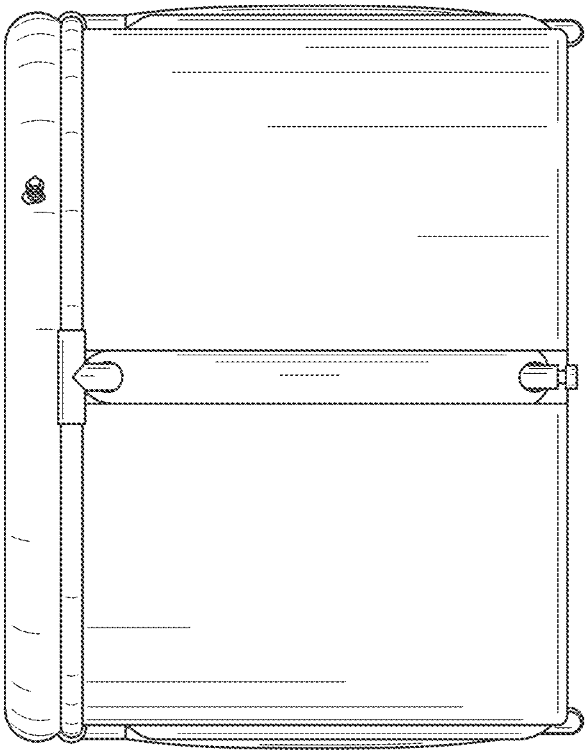
FIG. 3 is a second side view of the same, shown from an opposite side of the elongated ice bath as described herein.
Figure 4:
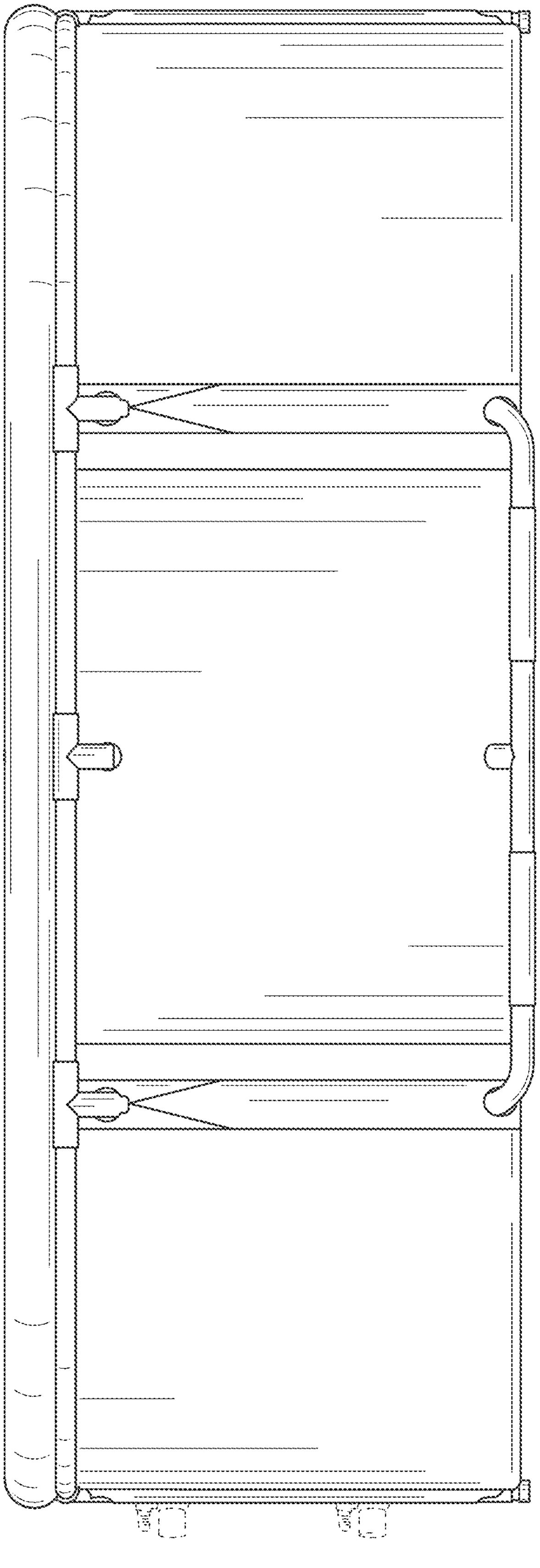
FIG. 4 is a third side view showing a long side of the elongated ice bath as described herein.
Figure 5:
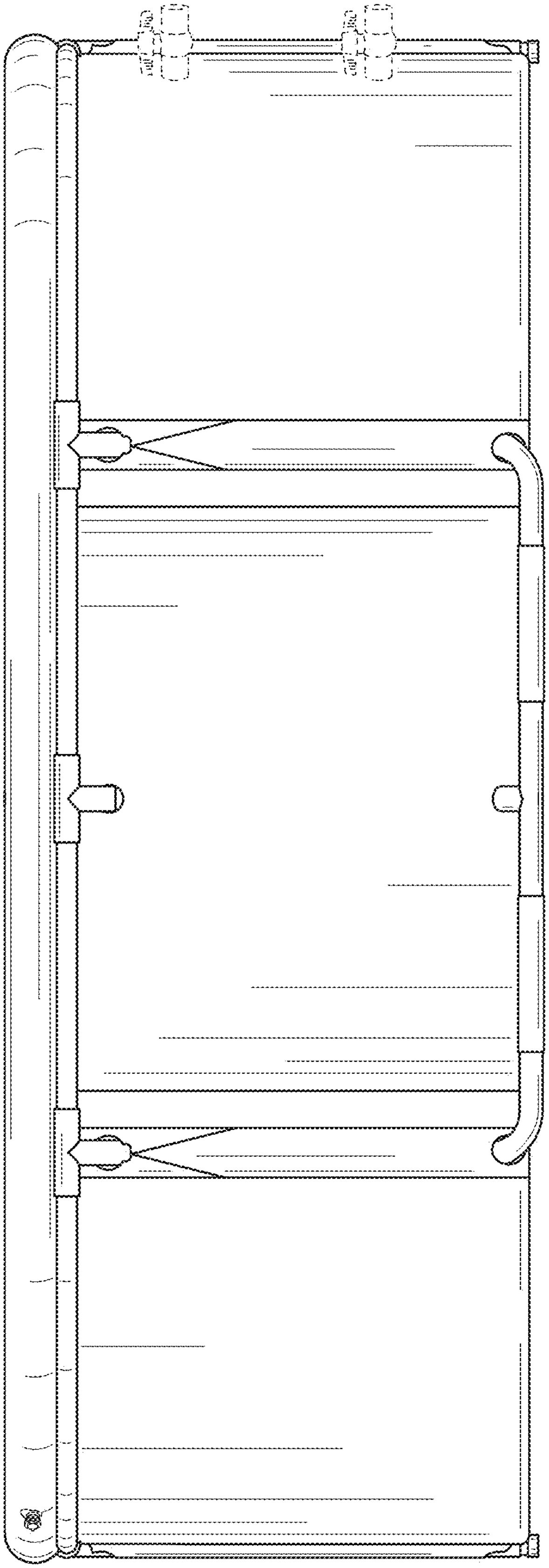
FIG. 5 is a fourth side view showing the opposite long side of the elongated ice bath as described herein.
Figure 6:
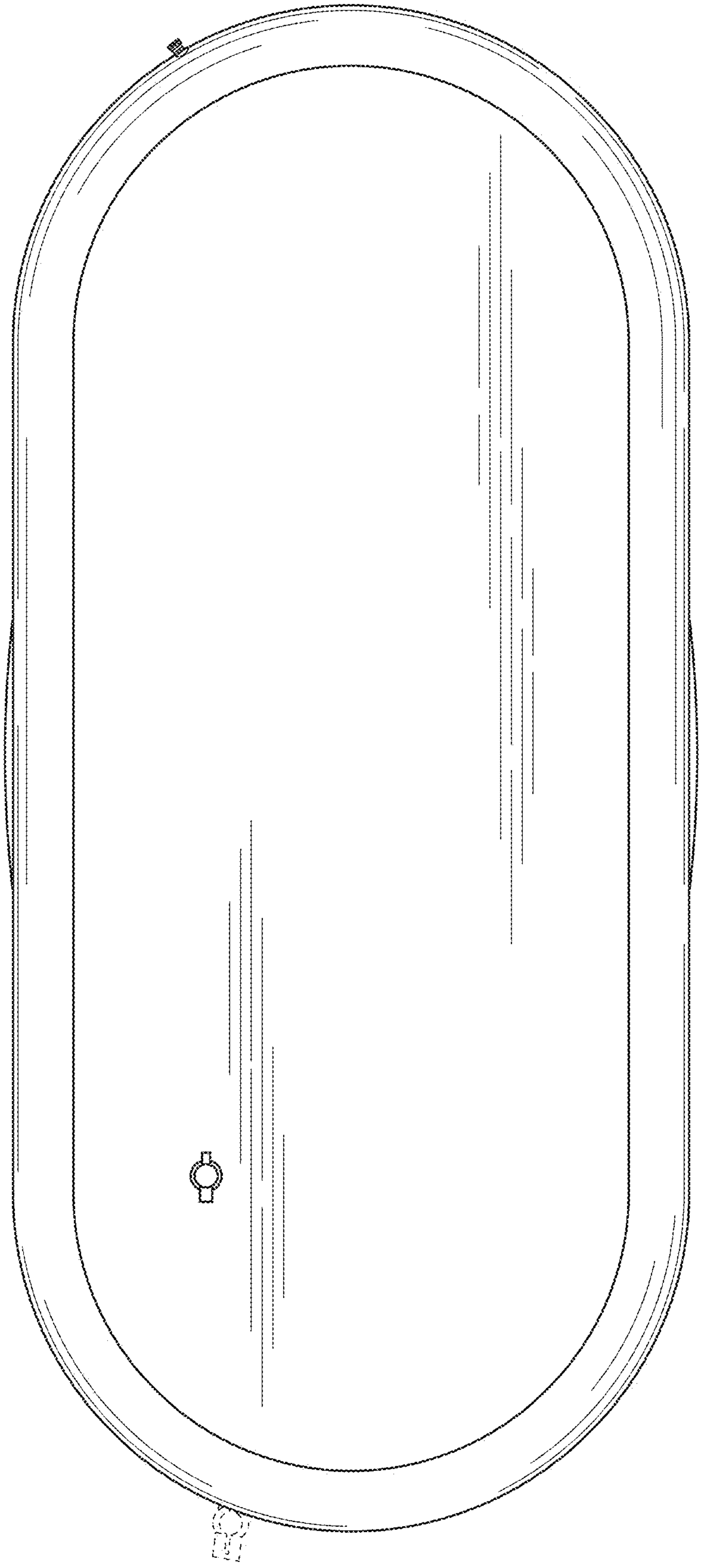
FIG. 6 is a top view of the elongated ice bath as described herein.
Figure 7:
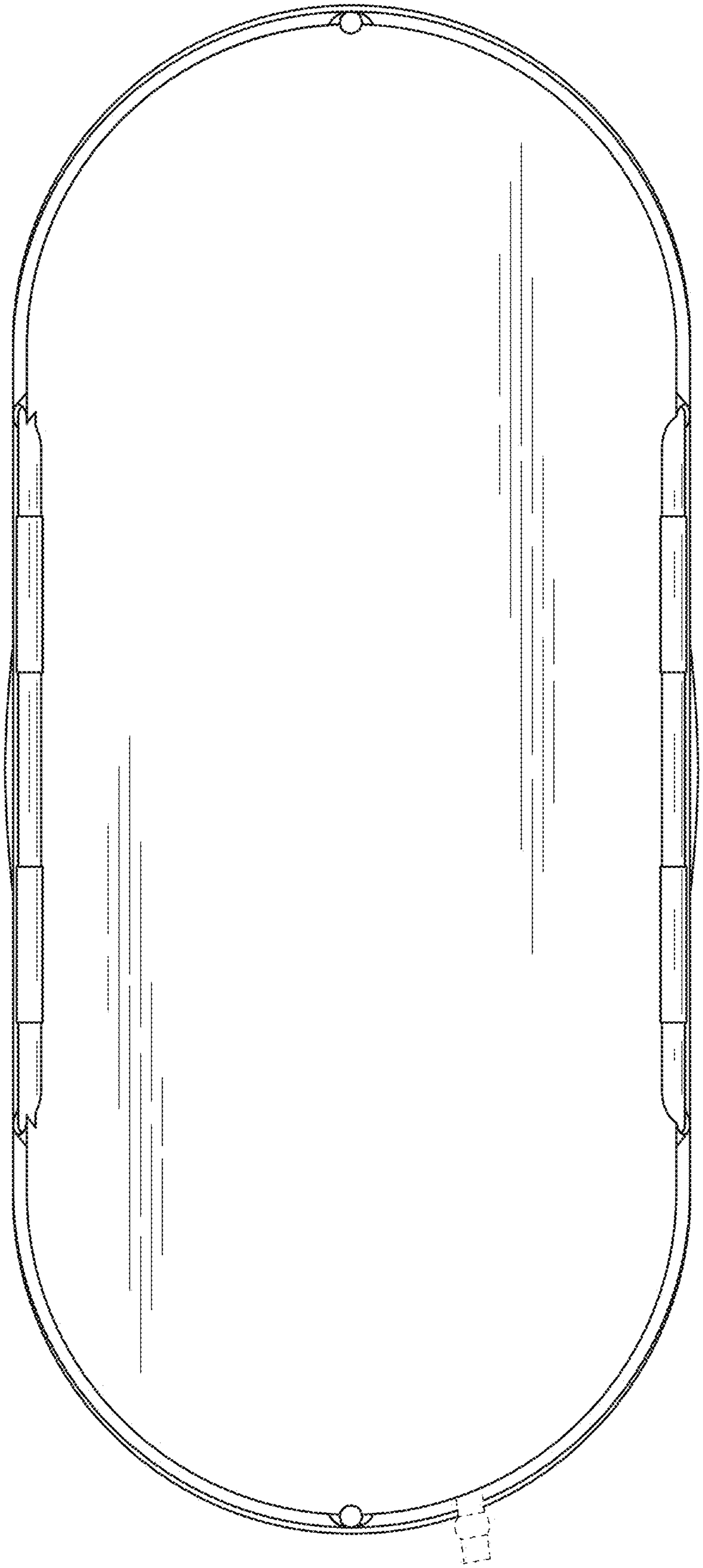
FIG. 7 is a bottom view of the elongated ice bath as described herein.

In the following description, reference is made to the accompanying drawings, which form a part hereof, and in which is shown by way of illustration various examples in which the disclosure may be practiced. It is to be understood that other examples may be utilized and implemented whereby structural and functional modifications may be made without departing from the scope and spirit of the present disclosure. Further, headings within this disclosure should not be considered as limiting aspects of the disclosure. Those skilled in the art with the benefit of this disclosure will appreciate that the examples are not limited to the headings.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to a collapsible and transportable ice bath system and methods of making such systems for use in human cold therapies. Research has indicated that cold therapy provides many physical benefits as well as mental and chemical benefits. For example, athletes and sports medicine has utilized cold water therapy for years, to help the active recovery of muscles.

Research has also shown that cold water stimulates leukocytes, the white blood cells that help fight off sicknesses. It also causes the lymphatic system to contract, forcing fluid through the lymph nodes. This process aids in detoxing the body and strengthening your immune system. Studies have also shown cold water immersion may substantially lower upper respiratory tract infections. Cold therapy has shown the ability increase your baseline dopamine. Dopamine is the molecule in our brain and body that is linked to motivation. Other evidence indicates that a lack of dopamine can contribute to depression, meaning that cold therapy may help to reduce depression and improve overall mood. Cold water therapy has been shown to be an effective supplemental treatment for stress relief by decreasing the stress hormone cortisol. Cold therapies are also known to positively stimulate the autonomic nervous system. Accordingly, the systems disclosed herein improve and adapt ice bath systems for cold therapies for everyday use in confined or limited space.

As shown in FIGS. 1-7, an elongated ice bath may include an elongated oval-shaped wall forming an opening and comprising a water inlet valve, a water exit valve, and an inflatable upper lip positioned on a top portion of the wall, and wherein the inflatable upper lip is rotatable from a lower stowed position to an upper deployed position after inflated with air, a bottom attached to the wall, wherein the wall and the bottom form an ice bath configured to contain water, a plurality of vertical frame members, a plurality of horizontal frame members, a plurality of T-shaped connecting members configured to engage the plurality of vertical frame members and the plurality of horizontal frame members, wherein the frame members are configured to support the wall.

Figure 8:
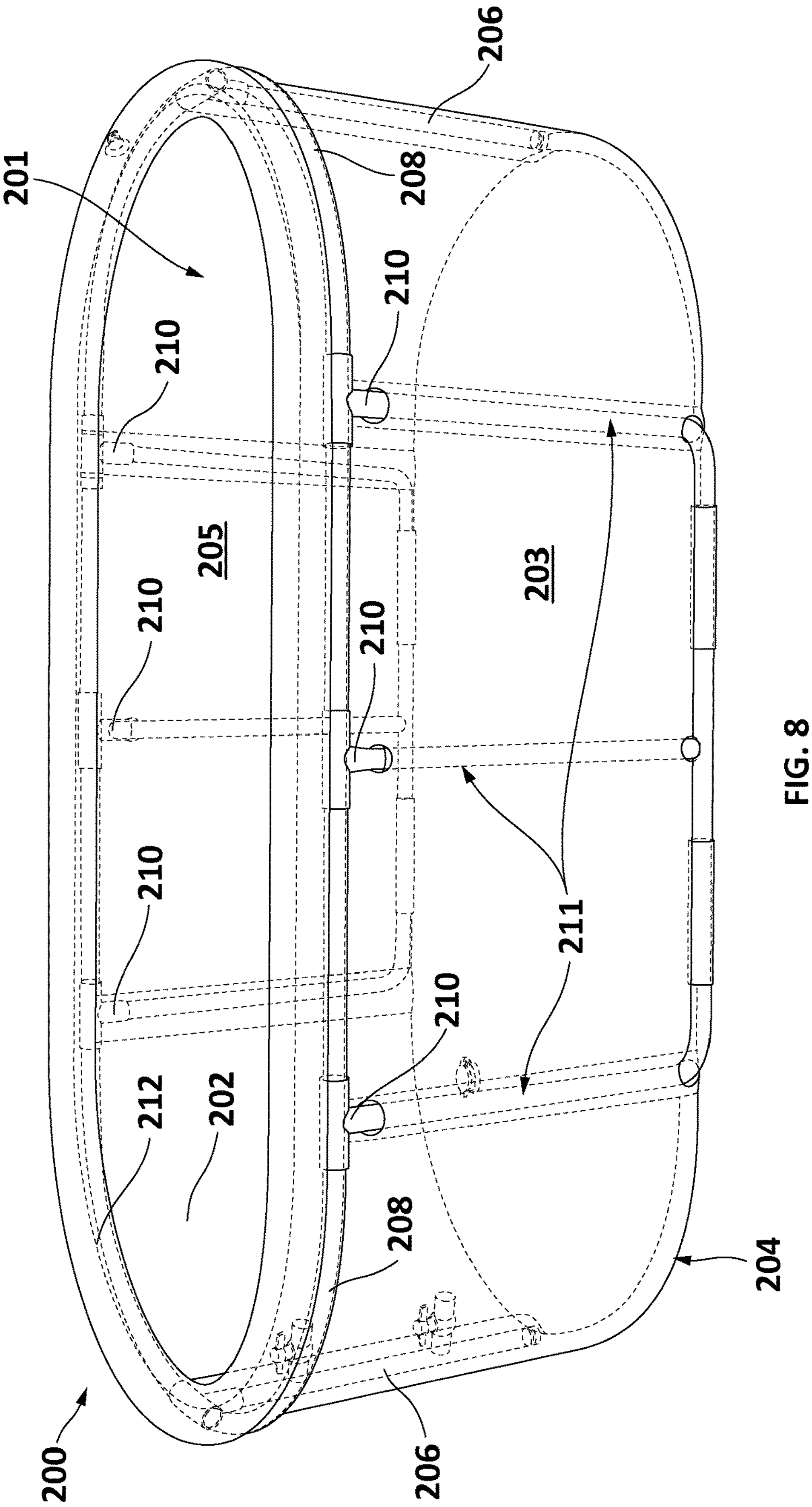
FIG. 8 depicts a perspective side view of an alternative embodiment of an elongated ice bath as disclosed herein.

As shown in FIG. 8, ice bath 200 may generally be elongated and oval-shaped. Such a shape better facilitates cold therapies for an adult sized human. Elongated ice tub 200 may include wall 202 and bottom 204 forming an area to contain water. Wall 202 and bottom 204 may be formed as a single, integrated structure. In other examples, wall 202 is affixed to bottom 204 as two separate components. Wall 202 and bottom 204 may be attached via stitching, polymer welding, RF welding, adhesive, or combinations thereof. Wall 202 may be a rectangular shaped component and the ends may be connected forming a generally oval-shaped piece of material. Wall 202 ends may be attached to each other via stitching, polymer welding, RF welding, adhesive, or combinations thereof. Wall 202 and/or bottom 204 may include various attachment points or slots 211 positioned around wall 202 and/or bottom 204 and configured to engage frame members to provide a rigid structure when ice bath 200 is in an unfolded (extended) or deployed position. Slots 211 may be formed integrally with wall 202 or may be attached to wall 202. A fold in the material forming wall 202 be stitched together to form slot 211. In other examples, additional material may be stitched or sewn, or attached to wall 202 to form slot 211. Wall 202 and bottom 204 may be formed of can all be formed of a TPU coated nylon fabric. In another example, a nylon fabric may be used as a base material for wall 202 and/or bottom 204. In other examples, the nylon fabric may be coated with a TPU laminate on one side or on each side of the fabric. In one example, the TPU nylon fabric may be waterproof. In still other examples, the material or fabric forming wall 202 and/or bottom 204 may incorporate antimicrobial materials to create a mildew-free environment. In one specific example, the nylon material or fabric may be 840d nylon with TPU. In yet other examples, ice bath 200 and the related components, e.g., wall 202, floor 204, a lid or cover (not shown) may be manufactured with alternative materials such as PVC, TPU coated nylon, coated fabrics, and other weldable and waterproof fabrics.

As also shown in FIG. 8, an upper portion of wall 202 may also form opening 201. An inflatable lip 212 may also be positioned at a top of wall 202 and surrounding opening 201. Vertical frame members 206 may be positioned at each end of ice bath 200. Ice bath 200 may also include horizontal frame members 208 positioned at an upper portion of each end of wall 202. Horizontal frame member 208 may be more flexible or less rigid than vertical frame members 206. Connection members 210 may be T-shaped and configured to engage vertical frame members 206 and horizontal frame members 208. In some examples, connection members 210 may include a circumference at each connection point that is larger than a circumference of vertical frame members 206 and horizontal frame members 208 such that the ends of vertical frame members 206 and horizontal frame members 208 may be removably inserted into connection member 210 thereby forming a support frame and supporting wall 202 when filled with water. Vertical frame member 206, horizontal frame member 208, and connection member 210 may be constructed of metals, alloys, polymers, composites, or combinations thereof.

Figure 9B:
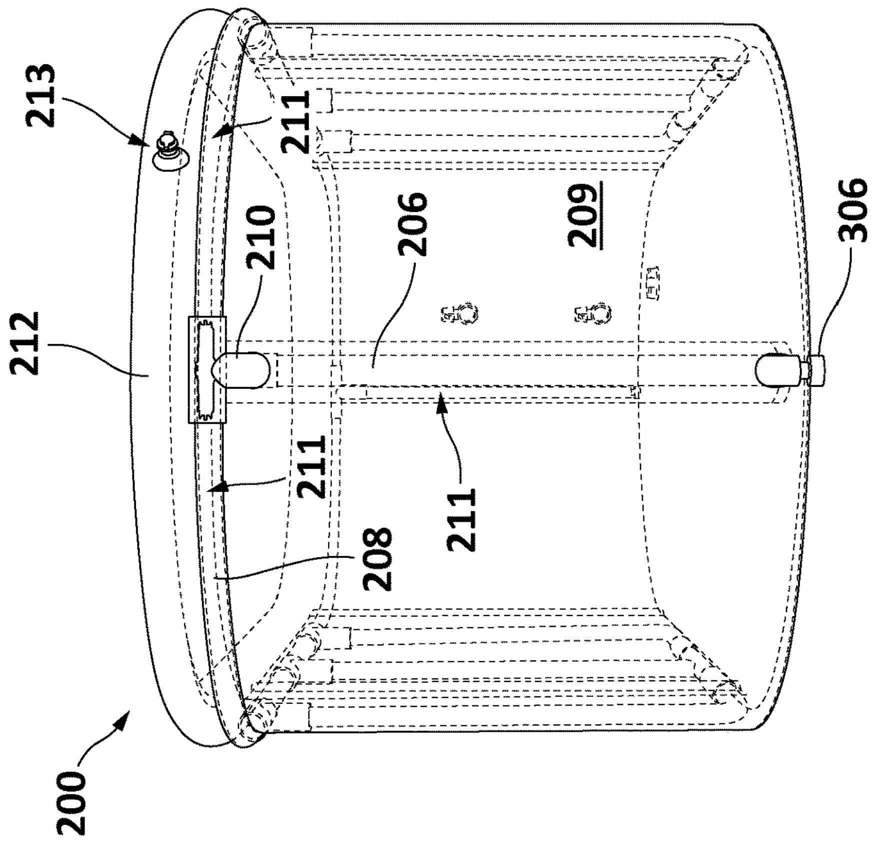
FIGS. 9A-9B depict end views of an alternative embodiment of an elongated ice bath as disclosed herein.
Figure 9A:
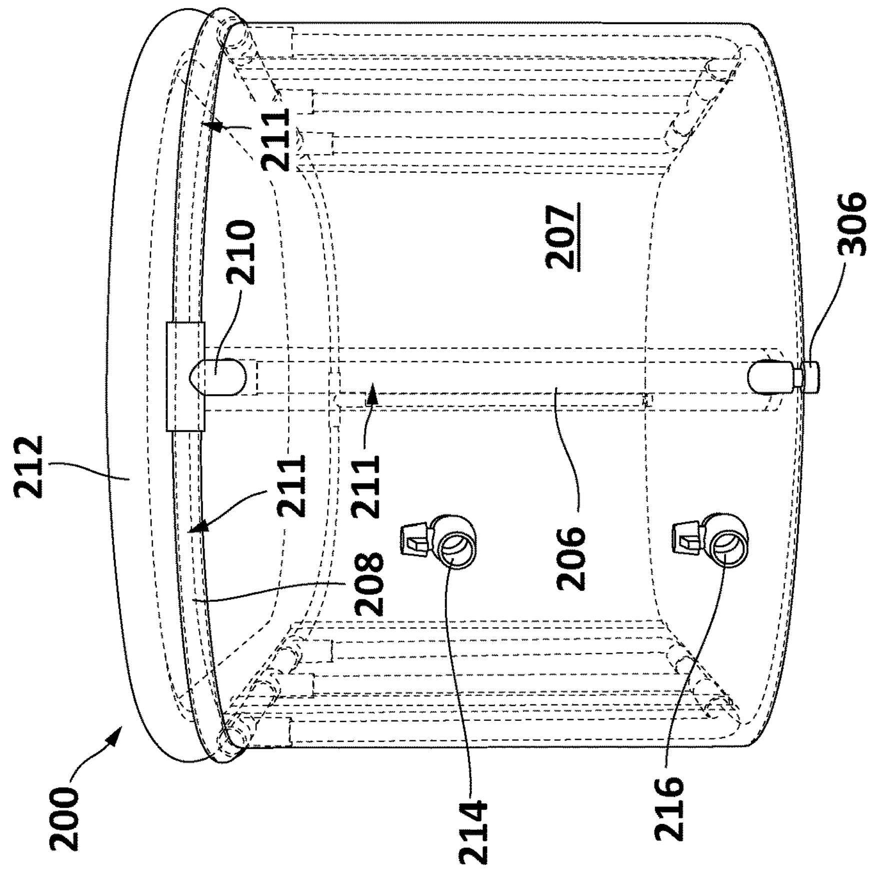

As shown in FIGS. 9A and 9B, ice bath 200 may include end 207 and end 209, and each may include vertical frame members 206. In some examples, vertical frame members 206 may include a foot 306 configured to engage a surface, such as the ground or the floor of a house. Foot 306 may be formed of a polymer or other rubber type of material to prevent movement across the surface. Vertical frame members 206 may be configured to removably engage connection members 210. Connection members 210 may be configured to engage horizontal frame members 208. In some examples, connection member may comprise an internal circumference that is large enough to allow connection member 210 to freely slide over horizontal frame member 208. Wall 202 may include at least one, and in some examples two, slots 211 positioned at the top of ends 205 and 205 and below lip 212, and slots 211 may be configured to engage horizontal frame members 208. Horizontal frame members 208 may have a curved or semi-circular shape when engaged with slots 211 and connection member 210. Ice bath 200 end 207 may include water inlet valve 214 and water exit valve 216. In some examples, water inlet valve 214 and water exit valve 216 may be configured to removably engage a chilling system configured to circulate and cool water contained within the bath. Water inlet valve 214 and water exit valve 216 may be vertically stacked to improve water cooling efficiency when engaged with a chilling system. In other examples, ice bath 200 end 205 may include lip 212 inflation valve 213. Inflation valve 213 may be configured to engage inflation devices such as pumps, automatic inflation devices, car tire inflation devices, sports equipment inflation devices, etc. In other examples, a user may manually inflate lip 212 via inflation valve 213.

Figure 10:
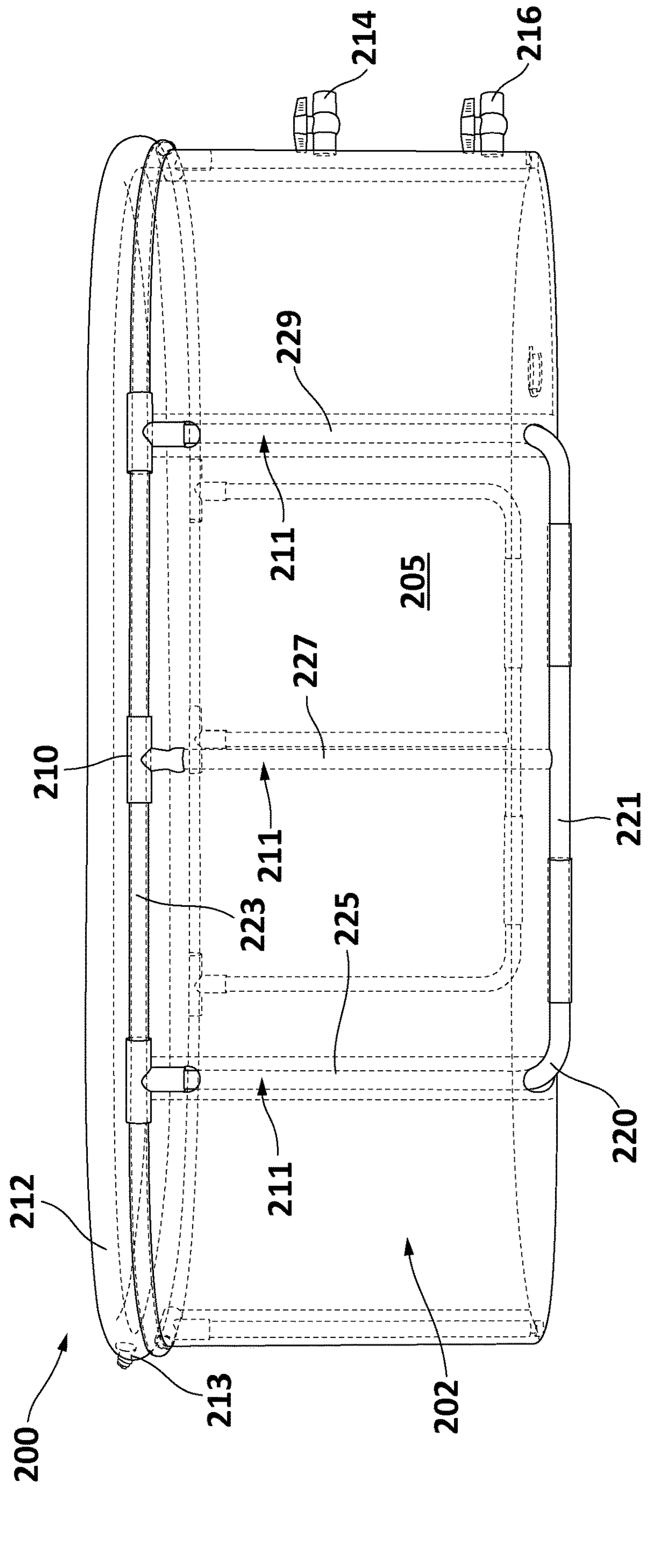
FIG. 10 depicts a side view of an alternative embodiment of an elongated ice bath as disclosed herein.

As shown in FIG. 10, ice bath 200 may have an elongated oval-shape. Unlike a circular or round ice bath, an elongated ice bath presents different challenges to support such a structure when filled with water. Critically, elongated sides 203 and 205 require increased bracing or strength to prevent a collapse when filled with water, Accordingly, a unique frame element, U-shaped frame member 220 solved this problem and is depicted in FIG. 10. U-shaped frame member 220 may include lower horizontal frame member 221 positioned at the lower portion of wall 202 and abutting bottom 204. U-shaped frame member may also include upper horizontal frame member 223 positioned near a top portion of wall 202 and below lip 212 when lip 212 when lip 212 is in an extended position. U-shaped frame member 220 may include vertical arms 225, 227, and 229. Lower horizontal frame member 221, upper horizontal frame member 223, and vertical arms 225, 227, and 229 may be configured to engage slots 211 and connection member 210. In some examples, U-shaped frame members 220 may be integrated with sides 203 and 205 of ice bath 200 such that no assembly is required other than inserting vertical frame members 206 in slots 211 at the ends of wall 202, inserting horizontal frame members 208 into slots 211 at an upper portion of wall 202, and using connecting members 210 to secure vertical frame members 206 and horizontal frame members 208 with each other. In some examples, vertical arms 225, 227, and 229 as well as lower horizontal frame member 221 may be integrally formed with U-shaped frame member 220. Upper horizontal frame member 223 may be a single component or may include at least two components. Connecting members 210 may be used to connect upper horizontal frame member(s) 223 with vertical arms 225, 227, and 229, as well as with horizontal frame members 208. Integrated U-shaped frame members 220 also provide a rigid rectangular and planar-shaped packed when ice bath 200 is collapsed and folded into a compact package. A user may inflate and deflate lip 212 via lip inflation valve 213. Water inlet valve 214 and water exit valve 216 may be positioned on wall 202 at an end opposite of the end where lip inflation device is positioned. Water inlet valve 214 and water exit valve 216 may include a handle to turn a flow of water on or off.

Figure 11:
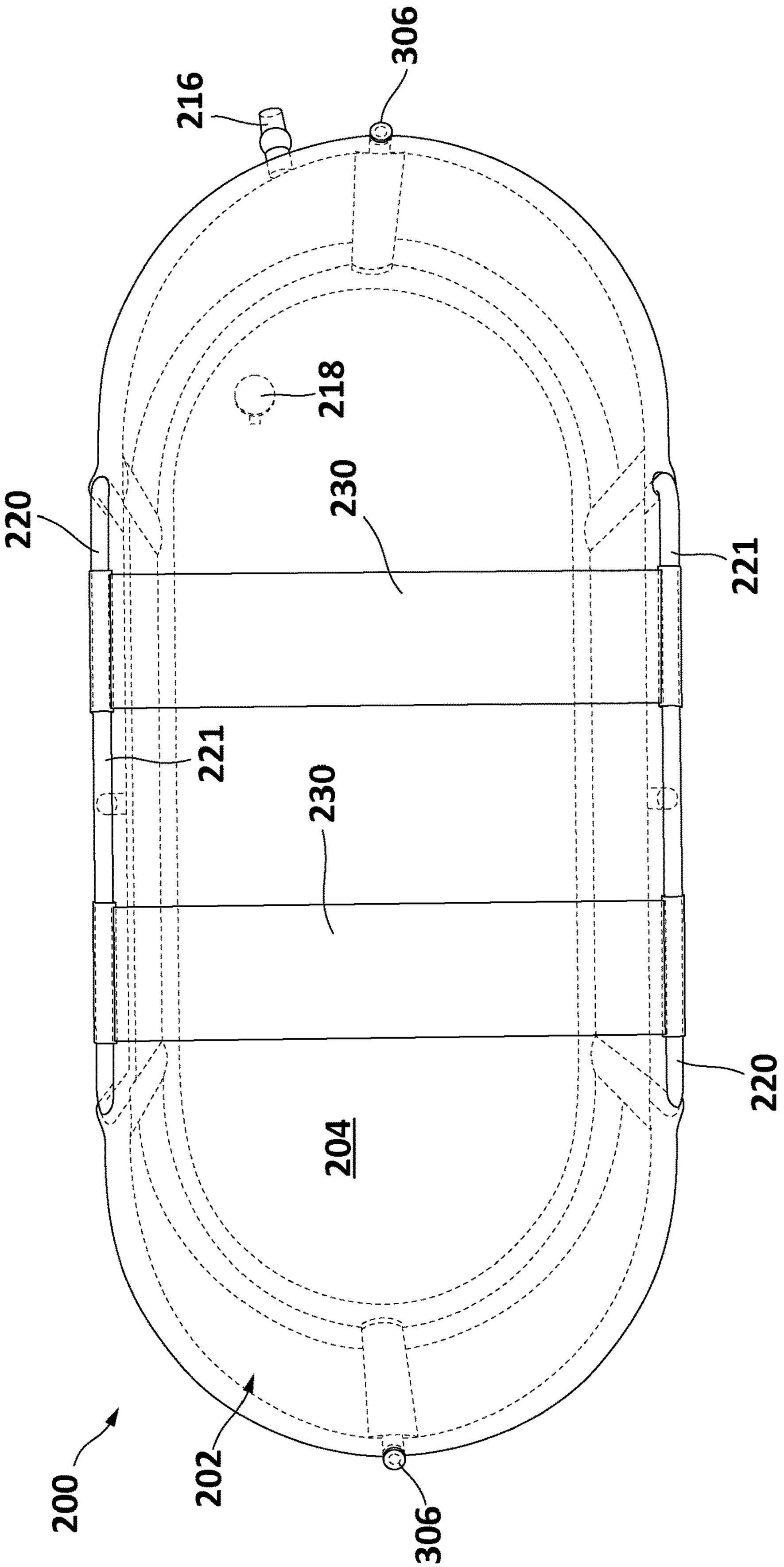
FIG. 11 depicts a bottom view of an alternative embodiment of an elongated ice bath as disclosed herein.

As shown in FIG. 11, ice bath 200 may include bottom 204. Bottom 204 may include an auxiliary drain 218 adjacent to water exit valve 216. Ice bath 200 may be supported by vertical frame member feet 306 as well as lower horizontal frame member 221 of U-shaped frame member 220. In some examples, ice bath 200 may also include support bands 230 affixed to lower horizontal frame member 221 of U-shaped frame member 220. Support bands 230 provide additional reinforcement to wall 202 sides 203 and 205, and bottom 204. Support bands 230 may be wrapped around lower horizontal frame member 221 and secured by stitching, welding, or mechanical fastener. Support bands 230 may be formed from PVC, TPU coated nylon, coated fabrics, and other weldable and waterproof fabrics.

Figure 12A:
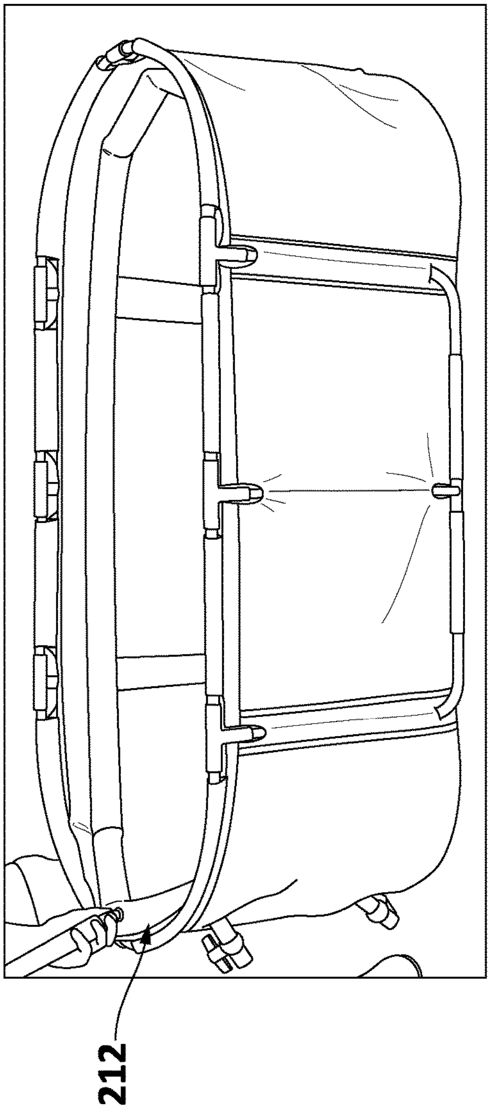
FIGS. 12A-12B depict an inflatable upper lip of an elongated ice bath in a stowed position and in an extended or deployed position as disclosed herein.
Figure 12B:
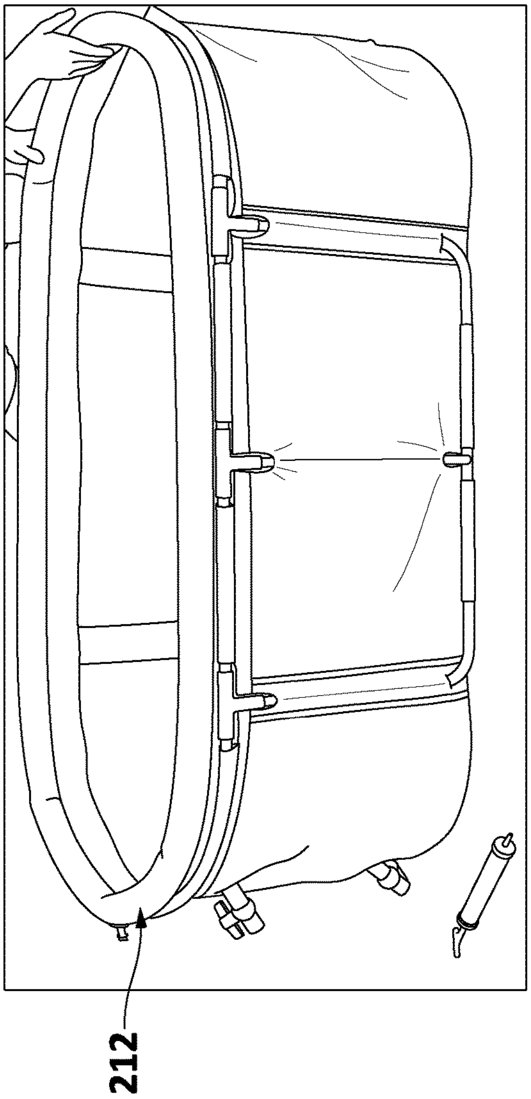

As shown in FIGS. 12A-12B, lip 212 may be configured to have a stowed position as shown in FIG. 12A and an unstowed or extended position as shown in FIG. 12B. As shown in FIG. 12A, lip 212 may be folded over and positioned within ice bath 200 while a user inflates lip 212. Once a user completes inflation of lip 212 via lip inflation valve 213 (not shown), the user can unfold lip 212 from the interior into an unstowed or extended position as shown in FIG. 12B. Positioning of lip 212 in an extended position provides a buffer over the opening and over the horizontal frame members, connection members, and over the U-shaped frame member upper horizontal frame members. Inflated lip 212, importantly, protects a user's limbs, head, and neck from the frame members and increases comfort when a user is submerged or partially submerged within ice bath 200. A user may deflate lip 212 via lip inflation valve 213 and fold lip 212 back into the stowed position within ice bath 200 and below a top portion of the horizontal frame members, the connection members, and the U-shaped frame member upper horizontal frame members.

Figure 13:
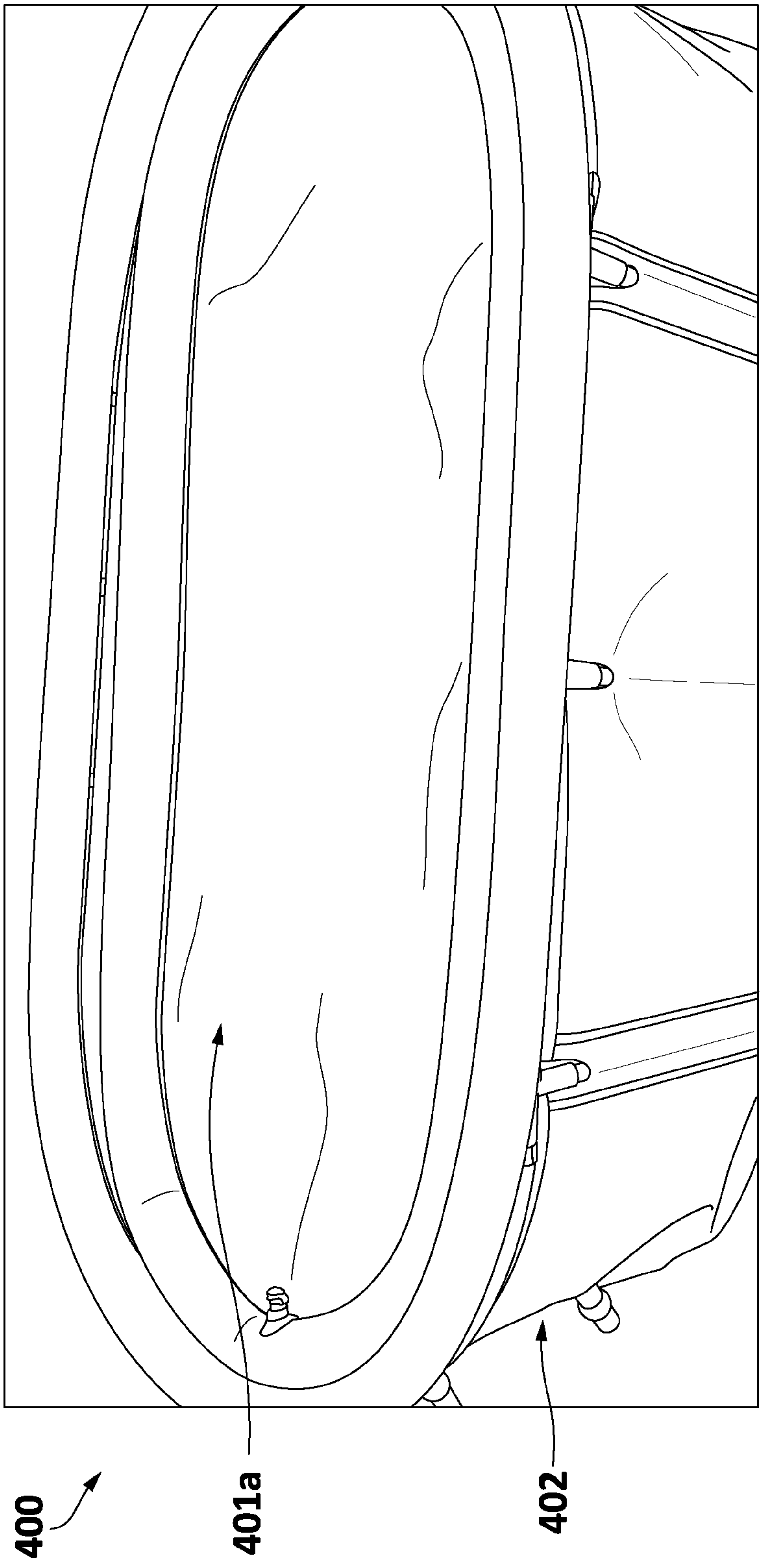
FIG. 13 depicts a partially inflatable lid for an elongated ice bath as disclosed herein.

As shown in FIG. 13, ice bath system 400 may include a partially inflatable lid 401*a*. Lid 401*a* may include an inflatable perimeter having an inflation valve. In some examples, the inflatable perimeter of lid 401*a* may be configured to fit an interior perimeter of the opening of wall 402. In certain examples, lid 401*a* may be secured to the opening via friction fit. The inflatable perimeter of lid 401*a* may be less than a perimeter of the opening of wall 402 to allow lid 401*a* to fit into a circumference of the opening of ice bath 400.

Figure 14:
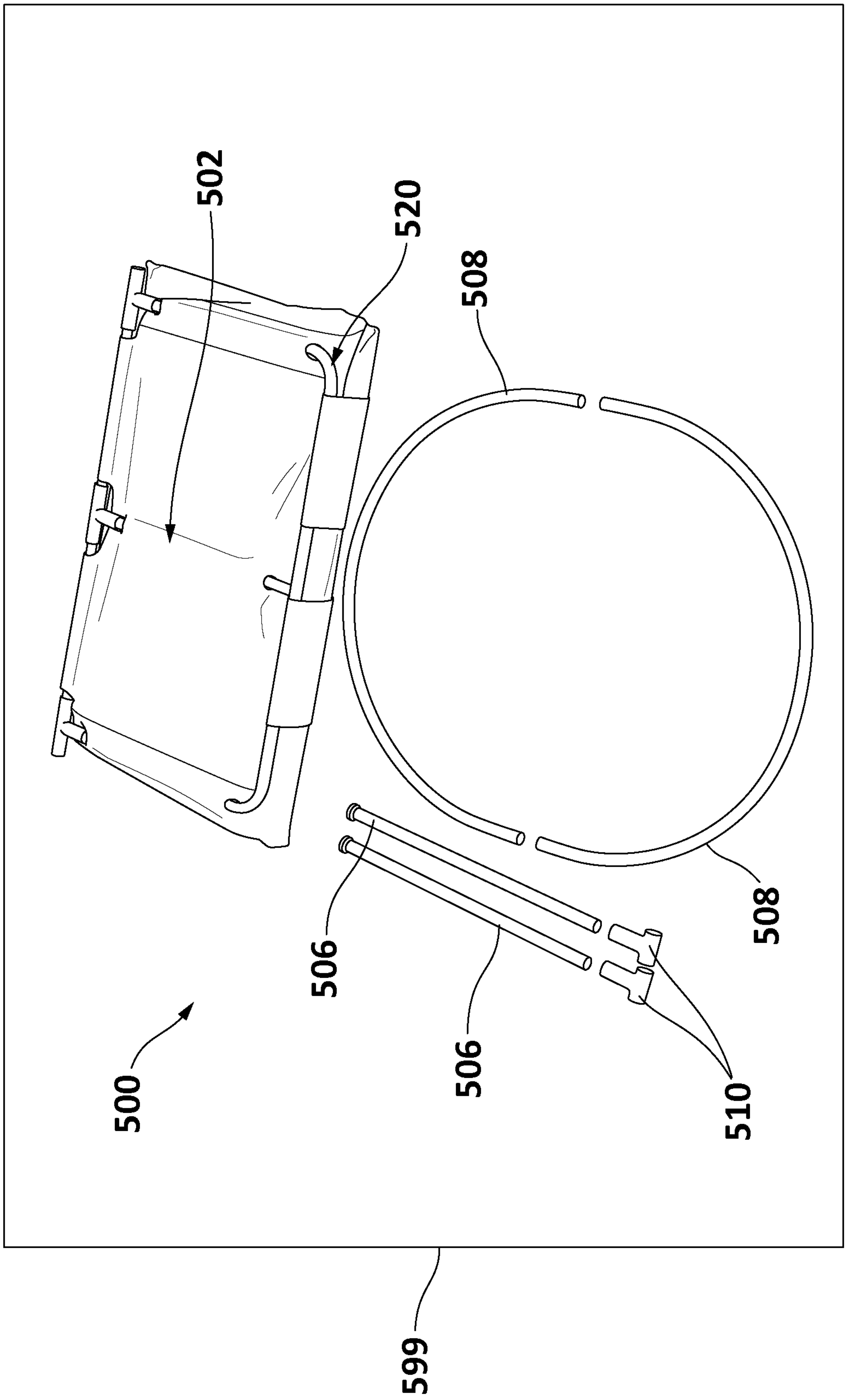
FIG. 14 depicts an unassembled elongated ice bath kit as disclosed herein

As shown in FIG. 14, kit 599 may include wall 502 having a bottom and forming an ice bath 500. Ice bath 500 may include at least two U-shaped frame members 520 integrated with wall 502 and configured to provide a rigid support to the sides of ice bath 500 when in the deployed/extended or unstowed configuration. As shown in FIG. 14, ice bath 500 is in the collapsed or stowed configured. Kit 599 may further include at least two vertical frame members 506, at least two horizontal frame members 508, and at least two connection members 510. In some examples, ice bath kit 599 may further include a chilling system as previously discussed. In other examples, ice bath kit 599 may further include an ice bath lid and/or an ice bath cover.

Although the subject matter has been described in language specific to structural features and/or methodological acts, it is to be understood that the subject matter defined in any statement of examples is not necessarily limited to the specific features or acts described above. Furthermore, while aspects of the present disclosure have been described in terms of preferred examples, and it will be understood that the disclosure is not limited thereto since modifications may be made to those skilled in the art, particularly in light of the foregoing teachings. For example, although various examples are described herein, features and/or steps of those examples may be combined, divided, omitted, rearranged, revised, and/or augmented in any desired manner. Various alterations, modifications, and improvements will be appreciated by those skilled in the art and are intended to be part of this description, even if not expressly stated herein, and are intended to be within the spirit and scope of the disclosures herein. The disclosures herein, therefore, are by way of example only, and are not limiting.

What is claimed is:

1. An ice bath comprising:
- an elongated oval-shaped wall forming an opening;
- a bottom attached to the wall, wherein the wall and the bottom form an ice bath configured to contain water;
- a plurality of vertical frame members;
- a plurality of horizontal frame members;
- a plurality of T-shaped connecting members configured to engage the plurality of vertical frame members and the plurality of horizontal frame members, wherein the frame members are configured to support the wall; and
- an inflatable upper lip positioned on a top portion of the wall, wherein the inflatable upper lip is rotatable from a lower stowed position to an upper deployed position after inflated with air.

2. The ice bath of claim 1, further comprising a drain.

3. The ice bath of claim 1, wherein the wall comprises a first side, a second side, a first end, and a second end, and wherein the first side and the second side each comprise an integrated U-shaped frame member forming a lower horizontal frame member and three vertical arms, and wherein the three vertical arms engage an upper horizontal frame member.

4. The ice bath of claim 3, wherein the plurality of vertical frame members and the plurality of horizontal frame members support the first end and the second end.

5. The ice bath of claim 3, further comprising at least two support bands configured to support the bottom.

6. The ice bath of claim 5, wherein the at least two support bands are affixed to the lower horizontal frame member of the first side and the lower horizontal member of the second side.

7. The ice bath of claim 1, further comprising a water inlet valve and a water exit valve configured to engage an external water cooling and circulation system.

8. The ice bath of claim 1, further comprising a lid.

9. The ice bath of claim 8, wherein the lid comprises an inflatable perimeter, and wherein the inflatable perimeter is configured to fit an interior perimeter of the opening.

10. A method of forming an ice bath comprising the steps of:
- forming an elongated oval-shaped wall having an opening, a first side, a second side, a first end, a second end;
- forming a bottom and affixing the bottom to the wall, wherein the wall and the bottom form an ice bath configured to contain water;
- forming a plurality of vertical frame members;
- forming a plurality of horizontal frame members; and
- forming a plurality of T-shaped connecting members configured to engage the plurality of vertical frame members and the plurality of horizontal frame members, wherein the frame members are configured to support the wall; and
- forming an inflatable upper lip positioned on a top portion of the wall, wherein the inflatable upper lip is rotatable from a lower stowed position to an upper deployed position after inflated with air.

11. The method of claim 10, further comprising forming an integrated U-shaped frame member in the first side and the second side, wherein the integrated U-shaped frame member includes a lower horizontal frame member and three vertical arms, and wherein the three vertical arms engage an upper horizontal frame member.

12. The method of claim 11, wherein the plurality of vertical frame members and the plurality of horizontal frame members support the first end and the second end.

13. The method of claim 11, further comprising forming at least two support bands configured to support the bottom and wherein the at least two support bands are affixed to the lower horizontal frame member of the first side and the lower horizontal member of the second side.

14. The method of claim 11, wherein the U-shaped frame member is formed of a metal, an alloy, a polymer, a composite, or combinations thereof.

15. The method of claim 10, further comprising forming a water inlet valve and a water exit valve configured to engage an external water cooling and circulation system.

16. The method of claim 10, further comprising forming a lid.

17. The method of claim 16, wherein the lid comprises an inflatable perimeter, and wherein the inflatable perimeter is configured to fit an interior perimeter of the opening.

18. An ice bath system comprising:

a wall comprising a water inlet valve, a water exit valve, and an inflatable upper lip positioned on a top portion of the wall, and wherein the inflatable upper lip is rotatable from a lower stowed position to an upper deployed position after inflated with air;

a bottom attached to the wall, wherein the wall and the bottom form an ice bath configured to contain water;

a plurality of vertical frame members;

a plurality of horizontal frame members;

a plurality of T-shaped connecting members configured to engage the plurality of vertical frame members and the plurality of horizontal frame members, wherein the frame members are configured to support the wall; and a chilling system removably engaged to the water inlet valve and the water exit valve, and configured to circulate and cool water contained within the bath.

* * * * *